United States Patent [19]

Baba et al.

[11] Patent Number: 5,564,532
[45] Date of Patent: Oct. 15, 1996

[54] MOUNTING MEMBER FOR DISK BRAKE

[75] Inventors: Haruhisa Baba; Tomoko Takeuchi; Motohiro Okade, all of Aichi, Japan

[73] Assignee: Aisin Seiki Kabushiki Kaisha, Kariya, Japan

[21] Appl. No.: 410,094

[22] Filed: Mar. 24, 1995

[30] Foreign Application Priority Data

Mar. 25, 1994 [JP] Japan ..................... 6-056362

[51] Int. Cl.$^6$ ................................. F16D 65/095
[52] U.S. Cl. .................... 188/73.39; 188/205 A; 188/73.47
[58] Field of Search ............ 188/73.37, 73.39, 188/73.46, 73.47, 205 A, 71.1, 73.35, 73.36

[56] References Cited

FOREIGN PATENT DOCUMENTS

| | | |
|---|---|---|
| 60-58938 | 4/1985 | Japan . |
| 60-58936 | 4/1985 | Japan . |
| 60-185734 | 12/1985 | Japan . |
| 63-57651 | 11/1988 | Japan . |
| 2-93131 | 4/1990 | Japan . |
| 2-132143 | 11/1990 | Japan . |

*Primary Examiner*—Josie Ballato
*Attorney, Agent, or Firm*—Oblon, Spivak, McClelland, Maier & Neustadt, P.C.

[57] ABSTRACT

An inner arm for receiving a brake torque applied to an inner pad when a car is running forwardly includes a reinforcing rib, in the portion thereof situated near the opposite side to the side where a torque receiving portion of the inner arm is located. The reinforcing rib projects inwardly from a mounting portion 31A of the inner arm 31A to the slightly upper portion of the torque receive portion 31A of the inner arm 31A in such a manner that the amount of projection of a portion thereof situated near the torque receive portion is greater than the amount of projection of a portion thereof situated near the mounting portion.

7 Claims, 15 Drawing Sheets

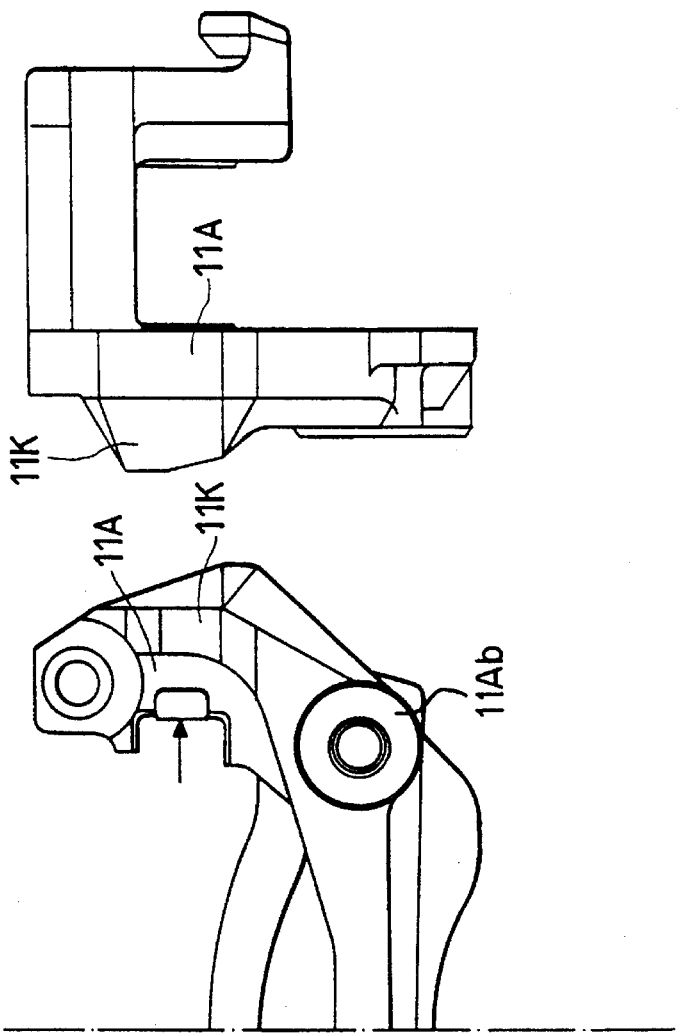
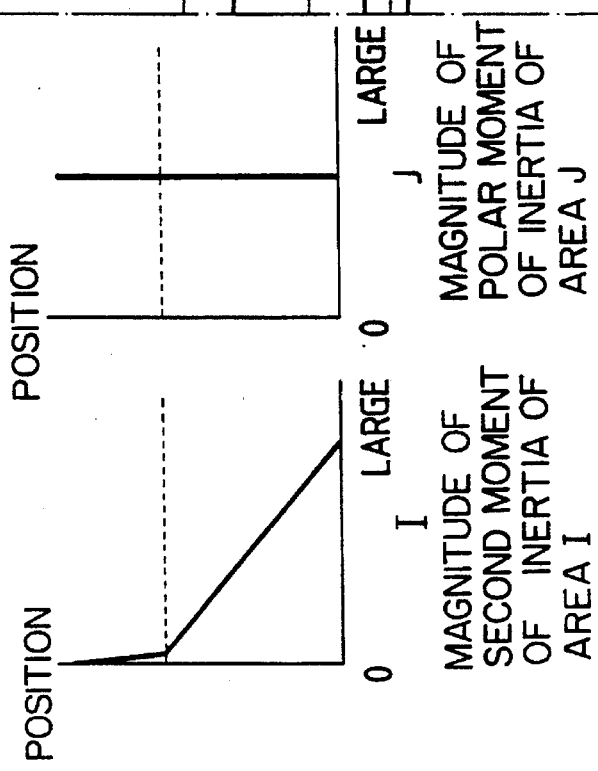

MOUNTING MEMBER FOR DISK BRAKE

BACKGROUND OF THE INVENTION

1. Field of the Invention

The present invention relates to a disk brake of a slide calipers type used as a wheel brake of an automobile and, in detail, to a mounting member for a disk brake in which a low frequency brake squeal is hard to occur.

2. Description of the Prior Art

There are known various structures for a disk brake of a slide calipers type which is used as a wheel brake for an automobile. In recent years in which reduction in weight of automotive parts has been promoted in order to improve the fuel efficiency and power performance of the automobile, a leading disk brake of a slide calipers type has such a structure as set forth in, for example, the TOYOTA ARISTO Repair Manual (published by Toyota Motor Mfg. Co., Service Div. on Dec. 1, 1991), on pages 8–37 to 8–56.

A mounting member for the above disk brake of a slide calipers type is a single member which, as shown in FIGS. 25 to 29, comprises: a pair of inner arms 1A and 1B respectively including torque receiving portions 1Aa and 1Ba for receiving a brake torque given to an inner pad (not shown) to be pressed against the inside surface of a rotor (not shown) rotatable integrally with a wheel (not shown), and also including, in their respective inner end portions in the rotor radial direction, mounting portions 1ab and 1Bb for fastening and fixing the inner arms 1A and 1B to the non-rotary parts (not shown) of an automobile such as a knuckle and the like by use of bolts (not shown); a pair of outer arms 1C and 1D respectively including torque receive portions 1Ca and 1Da for receiving a brake torque given to an outer pad (not shown) to be pressed against the outside surface of the rotor; a pair or connecting portions 1E and 1F respectively extending in the rotor axial direction in the outer peripheral space of the rotor and connecting the respective rotor radial direction outer ends of the two inner arms 1A and 1B integrally with the respective rotor radial direction outer ends of the two outer arms 1C and 1C; an inner bridge 1G extending in the rotor chord direction and connecting the respective rotor radial direction inner ends of the two inner arms 1A and 1B integrally with each other; and, an outer bridge 1H extending in the rotor chord direction and connecting the rotor radial direction inner ends of the two outer arms 1C and 1C integrally with each other.

In the above mounting member, when applying the brake in the car, the brake torque to the inner or outer pad is applied to the inner arm 1A and outer arm 1C or to the inner arm 1B or outer arm 1D according to whether the car runs forwardly or backwardly and, due to presence of the outer bridge 1H, the brake torques applied to the inner arm 1A and outer arm 1C (or the inner arm 1B and outer arm 1D) are distributed to the inner arm 1B and outer arm 1D (or the inner arm 1A and outer arm 1C). When compared with a mounting member of a type that the brake torques applied to the inner and outer pads are received only by the inner arm 1A and outer arm 1C or only by the inner arm 1B and outer arm 1D, the amounts of displacement of the inner arm 1A, 1B and outer arms 1C, 1D due to the elastic deformation of the mounting member 1 are small.

In the conventional mounting member 1 shown in FIGS. 25 to 29, the shapes of the inner arms 1A and 1B are determined mainly in consideration of the fact that the inner arms can deal with a bending moment caused by the brake torque applied to the inner pad. Thus, as shown FIG. 27, the dimensions of the inner arms 1A and 1B in the rotor shaft direction are smaller than those of the mounting portions 1Aa and 1Ba in the rotor shaft direction. And, the respective portions of the inner arm 1A, which receives the brake torque when the car is running forwardly, correspond to the bending moment caused by the brake torque applied to the inner pad and, as the inner arm 1A portions approach the mounting portion 1Aa, they have greater sectional secondary moments I. Also, the section shape of the outer bridge 1H is determined mainly in consideration of simply connecting the outer arms 1C and 1D to each other and, basically, the outer bridge 1H has a uniform section shape.

As for the disk brake as the automotive wheel brake, efforts have been concentrated on the control of the brake squeal in order to reduce the noise of the brake as well as the displeasure of a driver and others due to the noise. As a result of this, the high frequency brake squeal that has been often occurring for long time can be controlled now by interposing a rubber-coated shim between the inner pad and a piston for pressing the inner pad against the rotor as well as between the outer pad and a calipers claw portion for pressing the pad against the rotor, or by interposing a shim with a grease storage portion between them, or by chamfering the respective ends of the friction linings of the pads in the rotor peripheral direction (see the above-mentioned TOYOTA ARISTO Repair Manual, Japanese Utility Model Unexamined Publication No. Sho 60-58936, and Japanese Utility Model Unexamined Publication No. Sho 60-58938).

However, in the above-mentioned disk brake including the mounting member shown in FIG. 26 to 29 and other parts, the size or weight reduction thereof, the use of other material than asbestos in the friction lining, the weight reduction of the wheel peripheral parts of the automotive chassis, and the like have produced an ill effect as well, that is, the increased occurrence of a low frequency brake squeal (when compared with the high frequency brake squeal, the sound pressure level of the low frequency brake squeal is by far the higher and reaches far away). And, no effective measures have been so far developed against the low frequency brake squeal, which does not impede the promotion of the weight reduction of the brake disk and the non-use of the asbestos in the friction lining.

SUMMARY OF THE INVENTION

In view of the above circumstances of the conventional mounting member for a disk brake, it is an object of the invention to provide a mounting member for a disk brake which can minimize the occurrence of the lower frequency brake squeal and is relatively light in weight.

In attaining the above object, through various studies and evaluations including the analysis of the vibration modes of inner and outer pads obtained when the disk brake squeals, the present inventors have completed the present invention and developed a low frequency brake squeal reducing technique.

A first aspect of the invention has been achieved by the provision of a mounting member for a disk brake formed as a single member, comprising: a pair of inner arms respectively including torque receive portions for receiving a brake torque applied to an inner pad to be pressed against the inside surface of a rotor rotatable integrally with a wheel, and, in the rotor radial direction inner ends thereof, mounting portions for fastening and fixing said inner arms to the non-rotary parts of a car by use of bolts; a pair of outer arms respectively including torque receive portions for receiving a brake torque applied to an outer pad to be pressed against the outside surface of said rotor; a pair of connecting portions respectively extending in the rotor axial direction in the outer peripheral space of said rotor and connecting the rotor radial direction outer ends of said two inner arms integrally with the rotor radial direction outer ends of said outer arms; an inner bridge extending in the rotor chord direction and connecting the rotor radial direction inner ends of said two inner arms integrally with each other; and an outer bridge extending in the rotor chord direction and connecting the rotor radial direction inner ends of said two outer arms integrally with each other, wherein the respective portions of at least one of said two inner arms in tile rotor radial direction have not only the second moment of inertia of area I corresponding to a bending moment caused by said brake torque applied to said inner pad and increasing toward said mounting portions but also the polar moment of inertia of area J corresponding to a torsion moment caused by said brake torque applied to said outer pad and substantially uniform.

A second aspect of the invention has been achieved by the provision of a mounting member for a disk brake as set forth in the first aspect of the invention, wherein said torque receiving portion of said one inner arm is formed in a groove into which a substantially rectangular projection provided on the rotor chord direction end face of a back metal plate of said inner pad, and also includes, in the portion thereof situated near on the opposite side to the side where said torque receiving portion of said inner arm is formed, a reinforcing rib which projects inwardly from said mounting portion of said inner arm to the slightly upper portion of said torque receiving portion of said inner arm in such a manner that the amount of projection in the portion thereof situated near said torque receiving portion is greater than the amount of projection in the portion thereof situated near said mounting portion.

A third aspect of the invention has been achieved by the provision of a mounting member for a disk brake formed as a single member, comprising: a pair of inner arms respectively including torque receiving portions for receiving a brake torque applied to an inner pad to be pressed against the inside surface of a rotor rotatable integrally with a wheel, and, in the rotor radial direction inner ends thereof, mounting portions for fastening and fixing said inner arms to the non-rotary parts of a car by use of bolts; a pair of outer arms respectively including torque receiving portions for receiving a brake torque applied to an outer pad to be pressed against the outside surface of said rotor; a pair of connecting portions respectively extending in the rotor axial direction in the outer peripheral space of said rotor and connecting the rotor radial direction outer ends of said two inner arms integrally with the rotor radial direction outer ends of said outer arms; an inner bridge extending in the rotor chord direction and connecting the rotor radial direction inner ends of said two inner arms integrally with each other; and an outer bridge extending in the rotor chord direction and connecting the rotor radial direction inner ends of said two outer arms integrally with each other, wherein the section of said outer bridge in the rotor radial direction, in the portion thereof situated near one of said two outer arms, namely, one outer arm for receiving said brake torque applied to said outer pad when the car is running forwardly, has a substantially rectangular shape in which the rotor radial direction length A thereof is greater than the rotor axial direction length B thereof, and, in the portion thereof situated near said other outer arm, has a substantially rectangular shape in which the rotor radial direction length thereof is smaller than said length A and the rotor axial direction length thereof is greater than said length B, while said rotor radial direction section of said outer bridge is gradually varied and switched over from said one outer arm toward said other outer arm.

A fourth aspect of the invention has been achieved by the provision of a mounting member for a disk brake formed as a single member, comprising: a pair of inner arms respectively including torque receiving portions for receiving a brake torque applied to an inner pad to be pressed against the inside surface of a rotor rotatable integrally with a wheel, and in the rotor radial direction inner ends thereof, mounting portions for fastening and fixing said inner arms to the non-rotary parts of a car by use of bolts; a pair of outer arms respectively including torque receiving portions for receiving a brake torque applied to an outer pad to be pressed against the outside surface of said rotor; a pair of connecting portions respectively extending in the rotor axial direction in the outer peripheral space of said rotor and connecting the rotor radial direction outer ends of said two inner arms integrally with the rotor radial direction outer ends of said outer arms; an inner bridge extending in the rotor chord direction and connecting the rotor radial direction inner ends of said two inner arms integrally with each other; and an outer bridge extending in the rotor chord direction and connecting the rotor radial direction inner ends of said two outer arms integrally with each other, wherein the respective portions of at least one of said two inner arms in the rotor radial direction, namely, one inner arm for receiving said brake torque applied to said inner pad when the car is running forwardly, have not only the second moment of inertia of area I corresponding to a bending moment caused by said brake torque applied to said inner pad and increasing toward said mounting portions but also the polar moment of inertia of area J corresponding to a torque moment caused by said brake torque applied to said outer pad and substantially uniform, and, also wherein the section of said outer bridge in the rotor radial direction, in the portion thereof situated near one of said two outer arms, namely, one outer arm for receiving said brake torque applied to said outer pad when the car is running forwardly, has a substantially rectangular shape in which the rotor radial direction length A thereof is greater than the rotor axial direction length B thereof, and, in the portion thereof situated near said other outer arm, has a substantially rectangular shape in which the rotor radial direction length thereof is smaller than said length A and the rotor axial direction length thereof is greater than said length B, while said rotor radial direction section of said outer bridge is gradually varied and switched over from said one outer arm toward said other outer arm.

BRIEF DESCRIPTION OF THE DRAWINGS

FIG. 6(a) shows the bending moment of the inner arm caused by the brake torque applied to the inner pad;

FIG. 6(b) shows the torsion moment of the inner arm 11A caused by the brake torque applied to the outer pad.

FIGS. 6(c) and 6(d) are explanatory views showing the shape of an inner arm employed in the first embodiment;

DETAILED DESCRIPTION OF THE PREFERRED EMBODIMENTS

Figure 1:
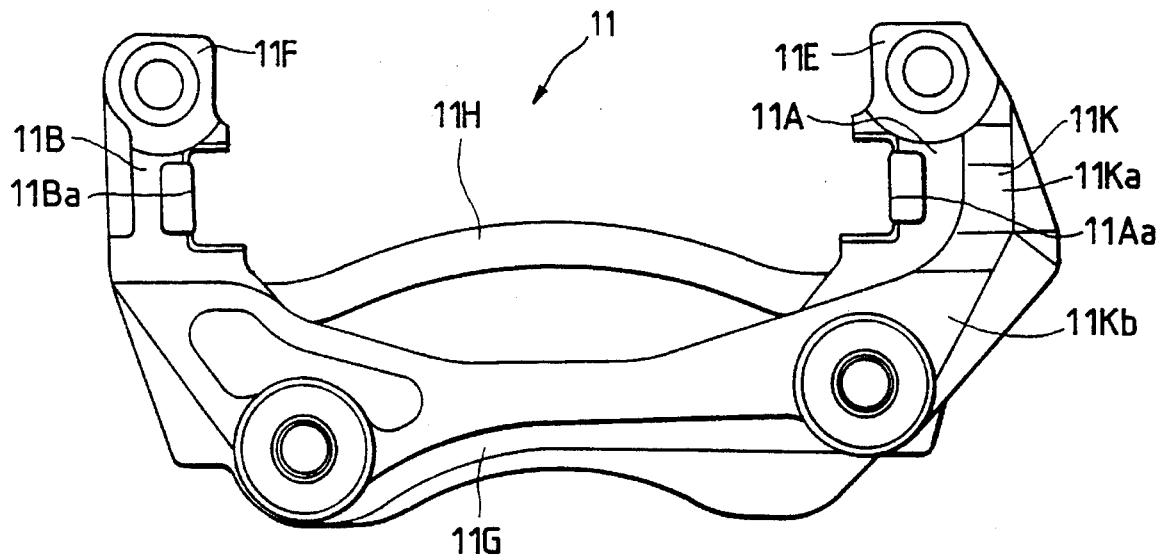
FIG. 1 is a front view (when viewed from the inner side) of a first embodiment of a mounting member for a disk brake according to the invention.
Figure 2:
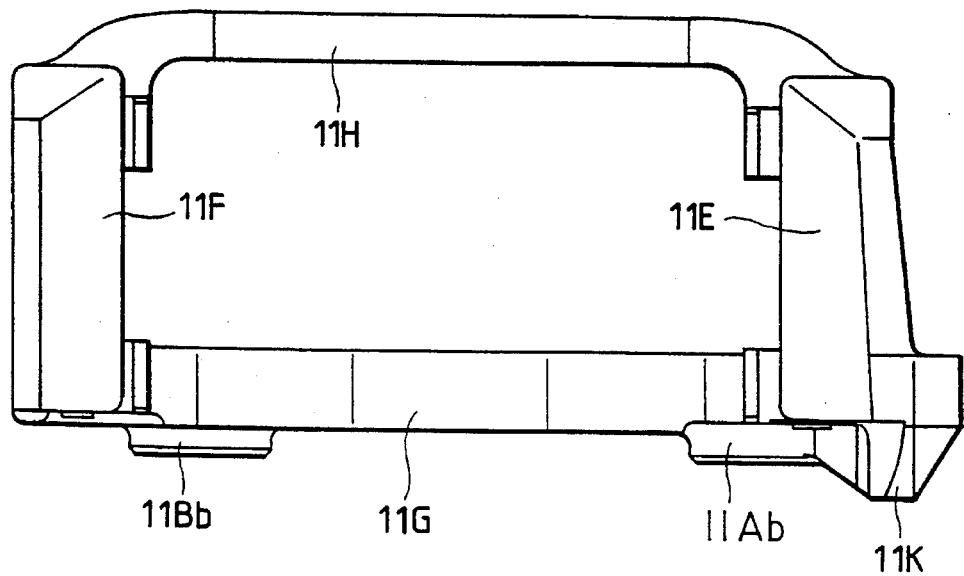
FIG. 2 is a plan view of the first embodiment.
Figure 3:
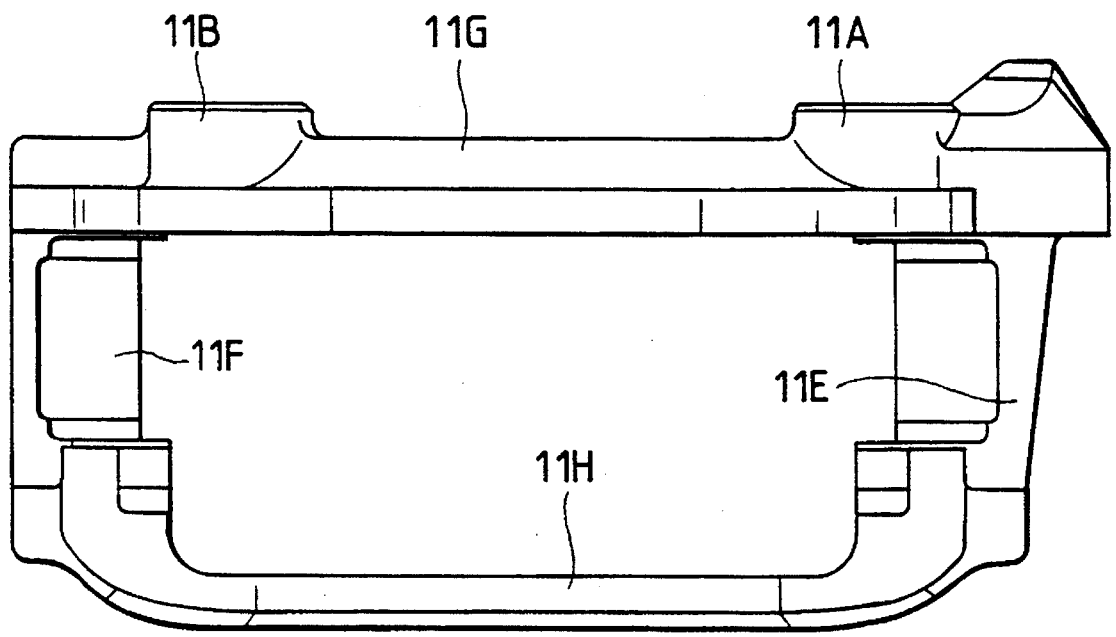
FIG. 3 is a bottom view of the first embodiment.
Figure 4:
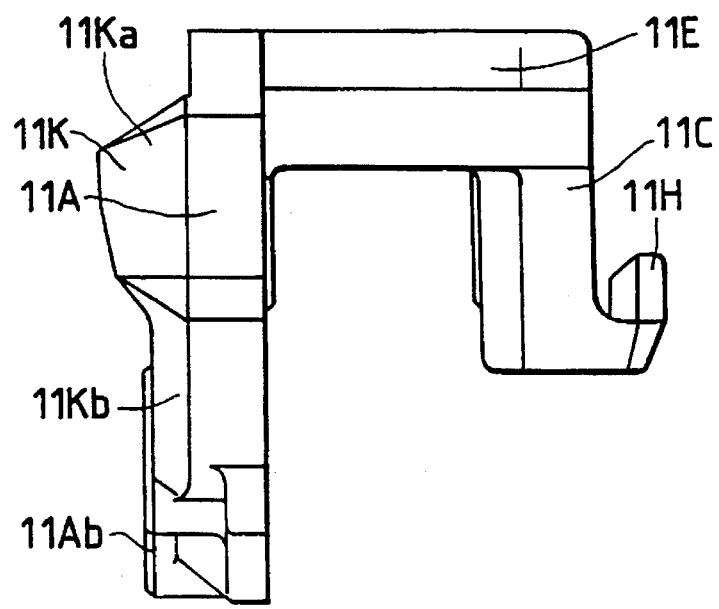
FIG. 4 is a right side view of the first embodiment.
Figure 5:
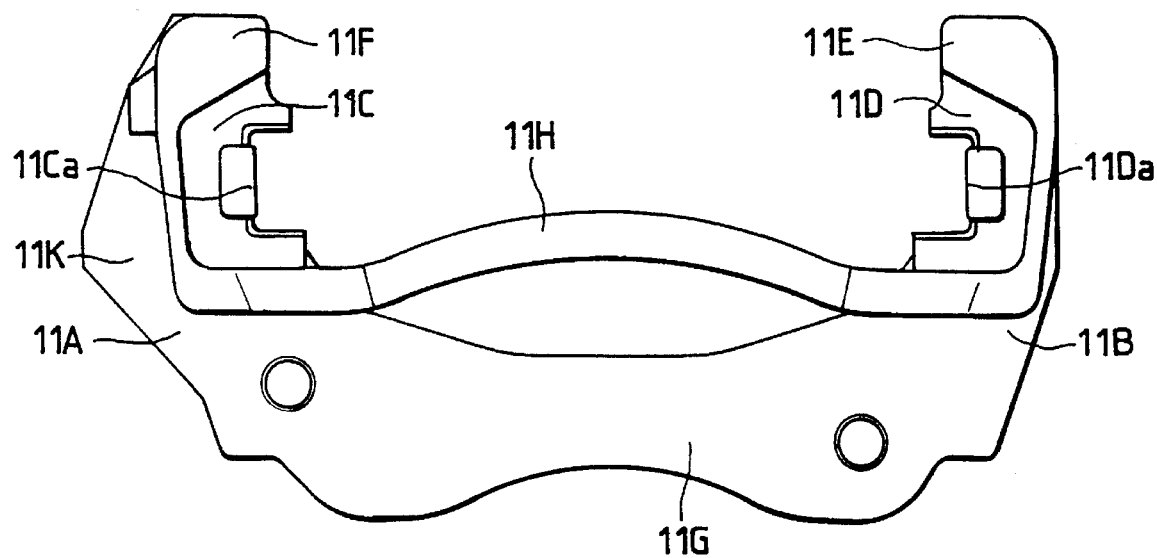
FIG. 5 is a back view of the first embodiment.
Figure 7:
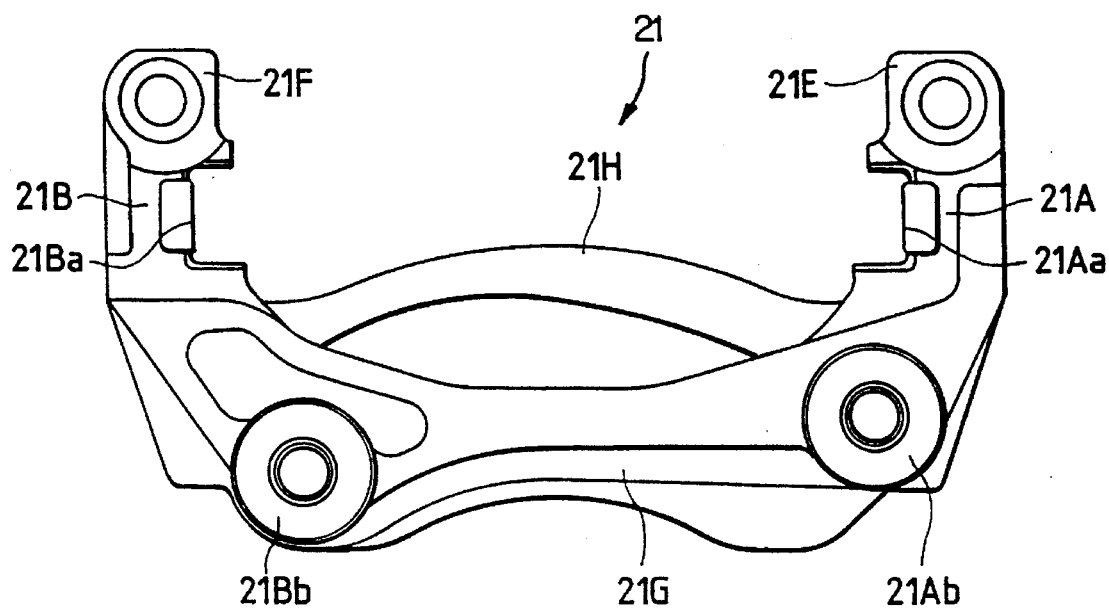
FIG. 7 is a front view (when viewed from the inner side) of a second embodiment of the mounting member for a disk brake according to the invention.
Figure 8:
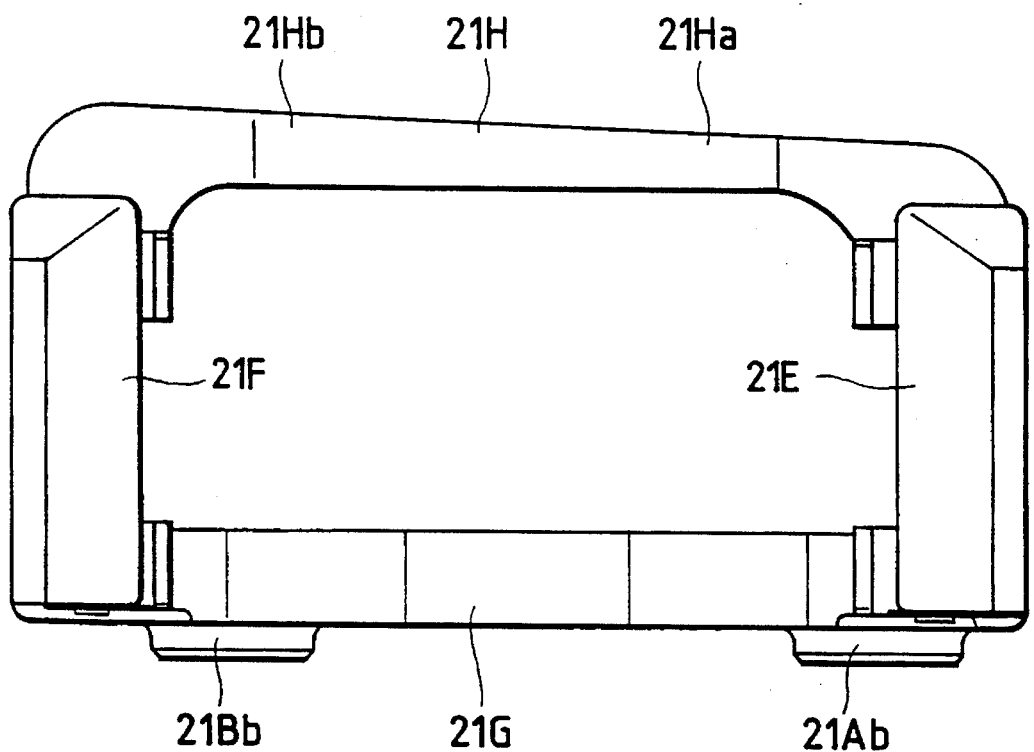
FIG. 8 is a plan view of the second embodiment.
Figure 9:
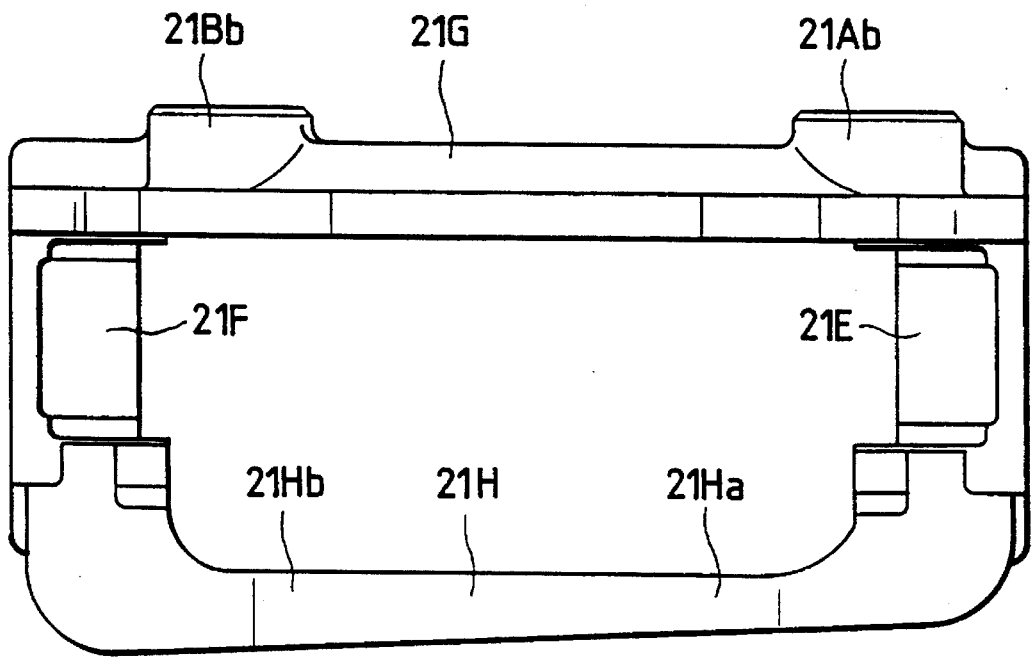
FIG. 9 is a bottom view of the second embodiment.
Figure 10:
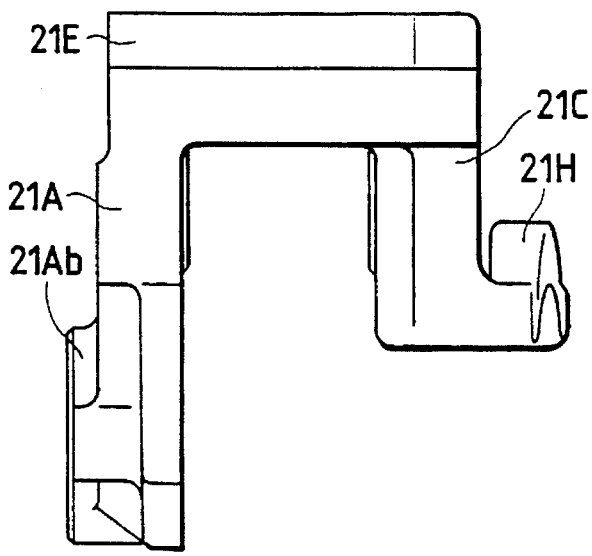
FIG. 10 is a right side view of the second embodiment.
Figure 12:
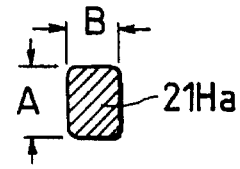
FIG. 12 is a section view taken along the line $X_1$—$X_1$ shown in FIG. 11.
Figure 13:
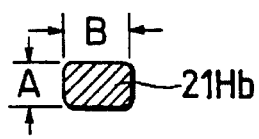
FIG. 13 is a section view taken along the line $X_1$—$X_1$ shown in FIG. 11.
Figure 11:
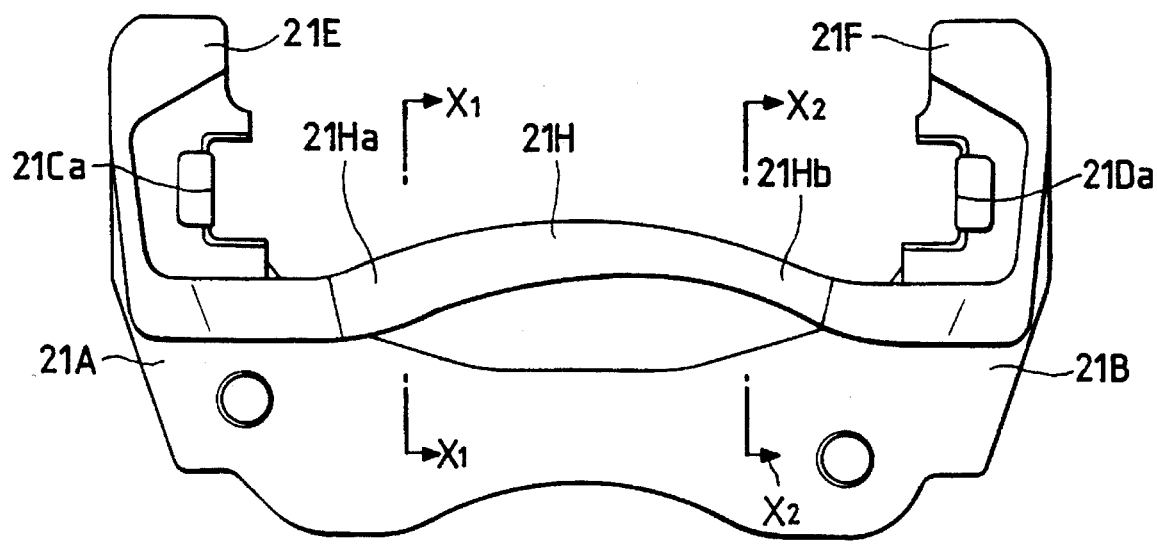
FIG. 11 is a back view of the second embodiment.
Figure 14:
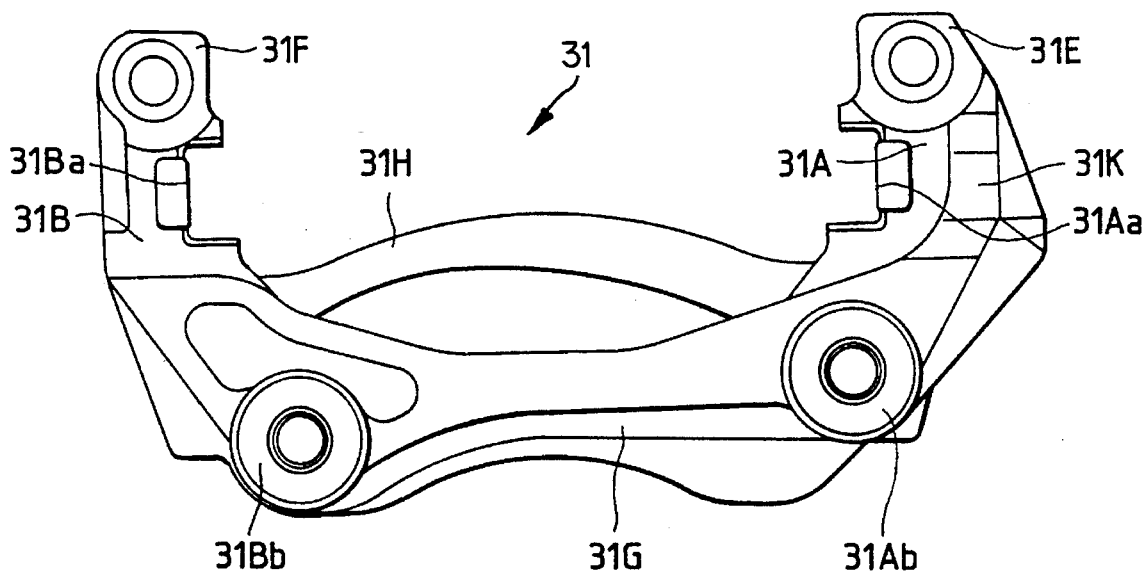
FIG. 14 is a front view (when viewed from the inner side) of a third embodiment of a mounting member for a disk brake according to the invention.
Figure 15:
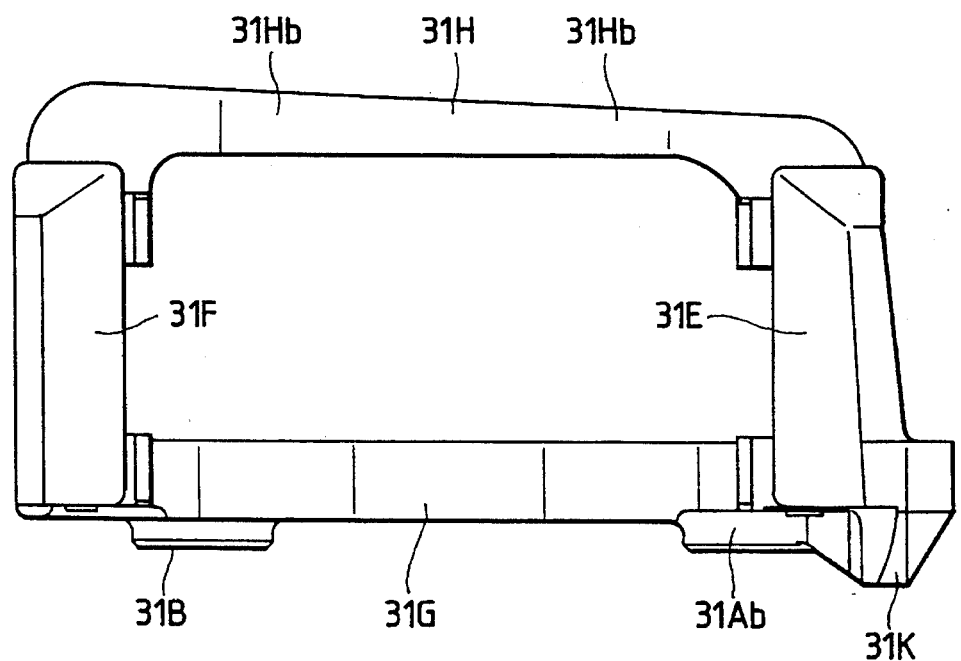
FIG. 15 is a plan view of the third embodiment.
Figure 16:
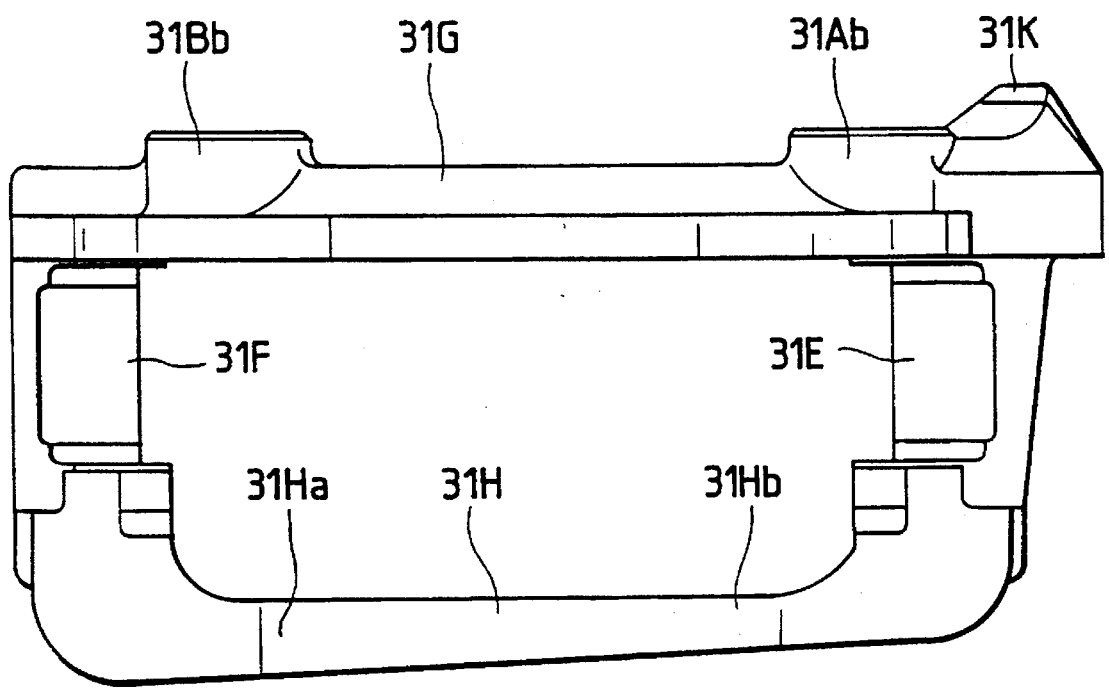
FIG. 16 is a bottom view of the third embodiment.
Figure 17:
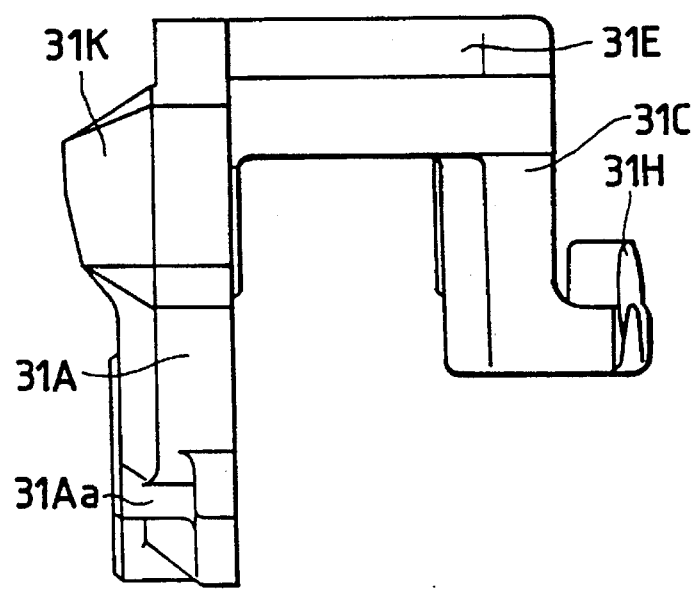
FIG. 17 is a right side view of the third embodiment.
Figure 18:
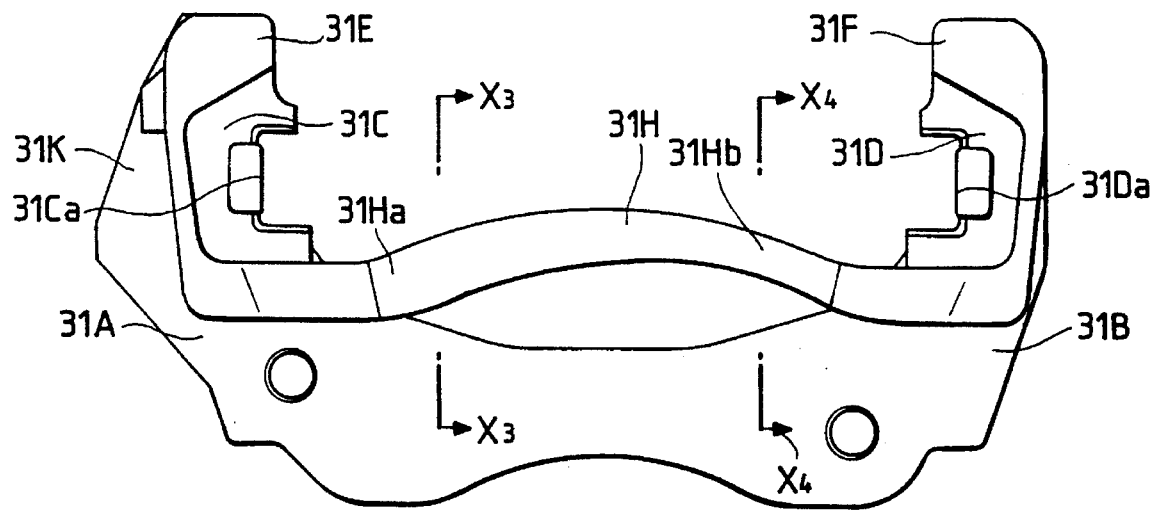
FIG. 18 is a back view of the third embodiment.
Figure 19:
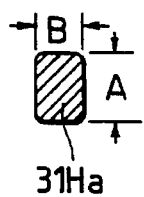
FIG. 19 is a section view taken along the line $X_3$—$X_3$ shown in FIG. 18.
Figure 20:
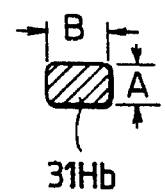
FIG. 20 is a section view taken along the line $X_4X_4$ shown in FIG. 18.
Figure 21:
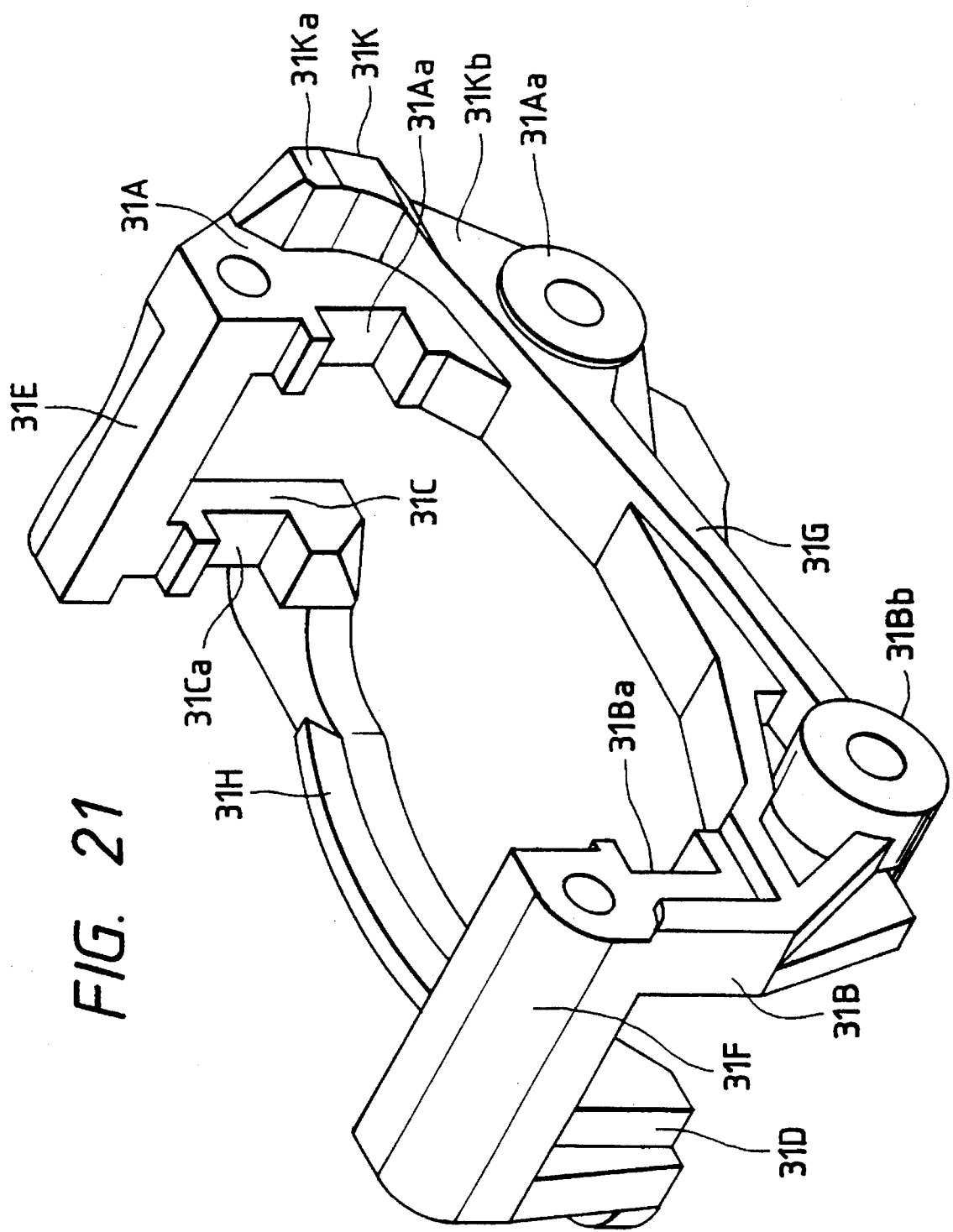
FIG. 21 is a schematic perspective view of the third embodiment.
Figure 22:
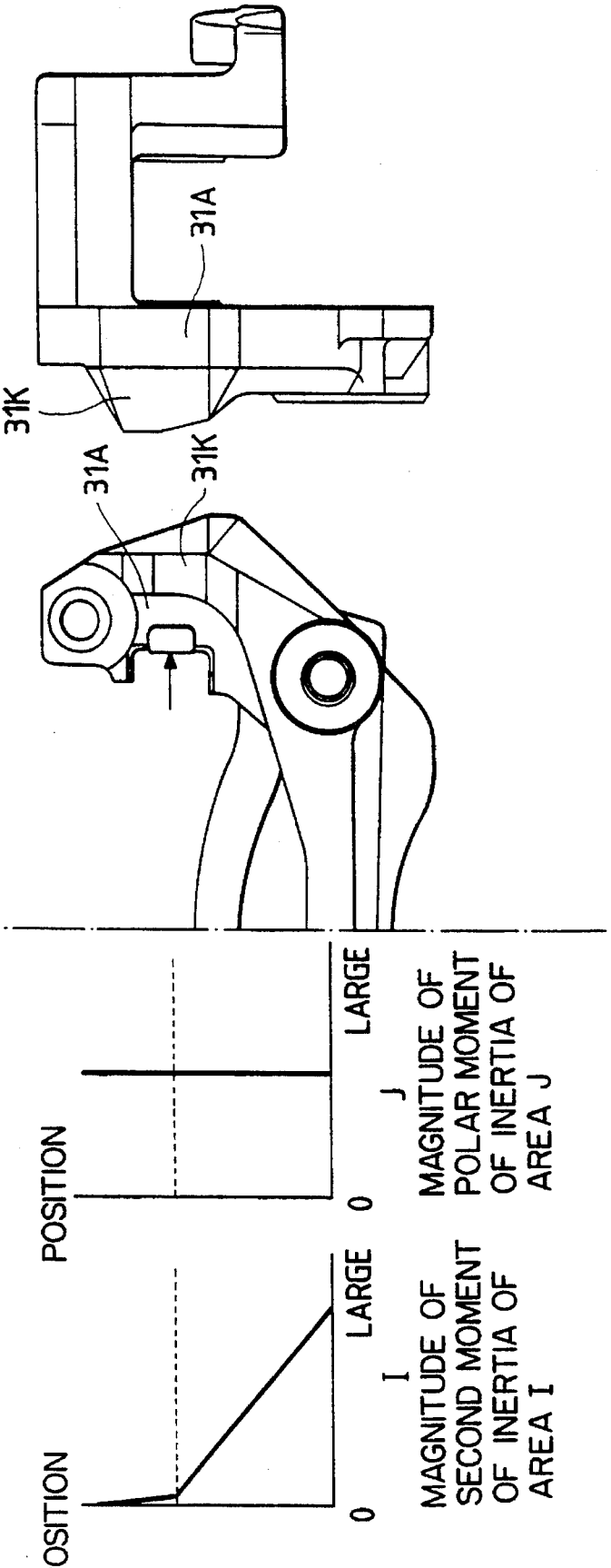
FIG. 22(a) shows the bending moment of the inner arm 31A caused by the brake torque applied to the inner pad.
FIG. 22(b) shows the torsion moment of the inner arm 31A caused by the brake toque applied to the outer pad.
FIGS. 22(c) and 22(d) are explanatory views of the shape of an inner arm employed in the third embodiment.

Now, description will be given below of the preferred embodiments of a mounting member for a disk brake according to the invention.

As set forth in a first embodiment shown in FIGS. 1 to 6, a second embodiment in FIGS. 7 to 13, and a third embodiment in FIG. 14 to 22, a mounting member (11, 21, 31) for a disk brake according to first to fourth aspects of the invention is similar to the conventional mounting member for a disk brake in that it is formed a single member and comprises a pair of inner arms (11A, 11B, 21A, 21B, 31A, 31B) respectively including torque receiving portions (11Aa, 11Ba, 21Aa, 21Ba, 31Aa, 31Ba) and mounting portions (11Ab, 11Bb, 21Ab, 21Bb, 31Ab, 31Bb), a pair of outer arms (11C, 11D, 21C, 21D, 31C, 31D) respectively including torque receiving portions (11Ca, 11Da, 21Ca, 21Da, 31Ca, 31Da), a pair of connecting portions (11E, 11F, 21E, 21F, 31E, 31F) for connecting the rotor radial direction outer ends of the inner arms (11A, 11B, 21A, 21B, 31A, 31B) integrally with the rotor radial direction outer ends of the outer arms (11C, 11D, 21C, 21D, 31C, 31D), an inner bridge (11G, 21G, 31G) for connecting the rotor radial direction inner ends of the two inner arms (11A, 11B, 21A, 21B, 31A, 31B) integrally with each other, and an outer bridge (11H, 21H, 31H) for connecting the rotor radial direction inner ends of the two outer arms (11C, 11D, 21C, 21D, 31C, 31D) integrally with each other (here, the torque receiving portions of the inner and outer arms each can be shaped in a groove into which a substantially rectangular projection provided on the rotor chord direction end face of a back metal plate attached to each of the inner and outer pads can be slidably fitted, or can be shaped in a projection which can be slidably fitted into a groove formed in the above end face of the above back metal plate, and so on).

However, according to a mounting member for a disk brake of the first aspect of the invention, as shown in the first embodiment of FIGS. 1 to 6 as well as in the third embodiment of FIGS. 14 to 22, the present mounting member is characterized in that the rotor radial direction portions of at least one of the two inner arms (11A, 11B, 31A, 31B), for example, the inner arm (11A, 31A) which receives a brake torque applied to the inner pad when the car runs forwardly respectively have the second moment of inertia of area I which corresponds to a bending moment caused by the brake torque applied to the inner pad and increases as they approach the mounting portion (11Ab, 31Ab), and also have the polar moment of inertia of area J which corresponds to a torsion moment caused by a brake torque applied to the outer pad and is substantially even.

According to a mounting member for a disk brake of the second aspect of the invention, in a mounting member for a disk brake of the first aspect of the invention, the present mounting member is characterized in that, as shown in the first embodiment of FIGS. 1 to 6 as well as in the third embodiment of FIGS. 14 to 22, the torque receive portion (11Aa, 31Aa) of one inner arm (11A, 31A) is formed in a groove shape into which a substantially rectangular projection provided on the rotor chord direction end face of the back metal plate of the inner pad can be slidably fitted, and also in that the inner arm (11A, 31A) further includes, in the portion situated near the opposite side to the side thereof in which the torque receiving portion (11Aa, 31Aa) of the inner arm (11A, 31A) is formed, a reinforcing rib (11K, 31K) which projects inwardly from the mounting portion (11Ab, 31Ab) of the inner arm (11A, 31A) to the slightly upper portion of the torque receiving portion (11Aa, 31Aa) of the inner arm (11A, 31A) in such a manner that the amount of projection of the portion (11Ka, 31Ka) thereof situated near the torque receive portion (11Aa, 31Aa) is greater than the amount of projection of the portion (11Kb, 31Kb) thereof situated near the mounting portion (11Ab, 31Ab).

A mounting member for a disk brake according to the third aspect of the invention, as shown in the second embodiment of FIGS. 7 to 13 as well as in the third embodiment of FIGS. 14 to 22, is characterized in that the sectional shape of the outer bridge (21H, 31H) in the rotor radial direction, in the portion thereof (21Ha, 31Ha) situated near one (21C, 31C) of the two outer arms (21C, 21D, 31C, 31D) for receiving a brake torque applied to the outer pad while the car is running forwardly, shows a substantially rectangular shape in which the length A thereof in the rotor radial direction is larger than the length thereof B in the rotor axial direction, while, in the portion thereof (21Hb, 31Hb) situated near the other outer arm (21D, 31D), shows a substantially rectangular shape in which the length thereof in the rotor radial direction is smaller than the length A and the length thereof in the rotor axial direction is larger then the length B, and the sectional shape of the outer bridge (21H, 31H) in the rotor radial direction is gradually varied and switched over from one outer arm (21C, 31C) toward the other outer arm (21D, 31D).

A mounting member for a disk brake according to the fourth aspect of the invention, as shown in the third embodiment in FIGS. 14 to 22, is characterized in that the respective rotor radial direction portions of one of two inner arms (31A, 31B), namely, one inner arm (31A) for receiving a brake torque applied to the inner pad while the car is running forwardly have not only the second moment of inertia of area I corresponding to a bending moment due to the brake torque applied to the inner pad and increasing toward the mounting portion (31Ab) but also the polar moment of inertia of area J corresponding to a torsion moment due to a brake torque applied to an outer pad and substantially uniform. The present mounting member for a disk brake is also characterized in that the section of the outer bridge (31H) in the rotor radial direction is, in the portion (31Ha) thereof situated near one of two outer arms (31C, 31D), namely, one outer arm (31C) for receiving the brake torque applied to the outer pad while the car is running forwardly, shows a substantially rectangular shape having a length A in the rotor radial direction larger than the length B thereof in the rotor axial direction, and, in the portion (31Hb) thereof situated near the other outer arm (31D), shows a substantially rectangular shape in which the rotor radial direction length thereof is smaller than the length A and the rotor axial direction length thereof is larger than the length B, while the sectional shape of the outer bridge (31H) in the rotor radial direction varies and is switched over gradually from one outer arm (31C) toward the other outer arm (31D).

Next, description will be given below of the operation of the above-mentioned mounting member for a disk brake according to the invention.

In order to solve the low frequency brake squeal, the present inventors at first studied the behaviors of the inner and outer pads when the brake squeal occurs. As the result of this study, it has been found that the vibration mode of the respective pads when the brake squeals includes a bending vibration mode in which the pads are repeatedly bent in the rotor axial direction and a rigid body vibration mode in which the pads are caused to reciprocate repetitively mainly in the rotor chord direction, and the ratio of the bending vibration mode is by far larger than that of the rigid body vibration mode in the high frequency brake squeal while the ratio of the rigid body vibration mode is by far larger than that of the bending vibration mode in the low frequency brake squeal. The rigid body vibration mode is caused by the elastic deformation of the mounting member due to the brake torque and, therefore, the present inventors have found that, in order to reduce the low frequency brake squeal, it is effective to improve the rigidity of the mounting member.

Next, in order to find out a measure for improving the rigidity of the mounting member, the present inventors mounted five acceleration sensors respectively at the five positions (in particular, the respective ends of a pair of connecting portions, and the central portion of the outer bridge) of the mounting member for a disk brake loaded into a car, and studied and analyzed the behaviors of the mounting member when the low frequency brake squeal occurs. The study and analysis showed us that the above five portions are not vibrated so much when the low frequency brake squeal does not occur, whereas, when the low frequency brake squeal occurs, the inner and outer sides of the mounting member are both vibrated greatly and the vibration of the outer side is by far greater than that of the inner side.

The present inventors assumed that the above great vibrations of the inner and outer sides are caused by the shortage of the bending rigidity of the inner arms, the shortage of the torsion rigidity of the inner arms and the shortage of the rigidity of the outer bridge. Therefore, the present inventors produced a new mounting member experimentally which was increased in thickness to thereby enhance the rigidity thereof by far greatly, installed it to the car, mounted the acceleration sensors in the above-mentioned manner, and confirmed the effects of the rigidity of the mounting member on the low frequency brake squeal. As a result of this, we have confirmed that the low frequency brake squeal is hard to occur when the inner and outer sides of the mounting member are both small in amplitude and the amplitude of the outer side is equal to that of the inner side. However, this experimental mounting member, in which no low frequency brake squeal occurred, is about 2.1 times in weight a conventional mounting member in which the rate of occurrence of the low frequency brake squeal (that is, the number of brake tests in which the brake squeal occurred/the number of brake tests) is almost 100%. Therefore, the experimental mounting member is not able to satisfy the recent need for reduction in weight.

Further, the results of the above test show that the difference between the rates of occurrence of the low frequency brake squeal is not caused by the difference between the natural frequencies of the mounting members.

Figure 23:
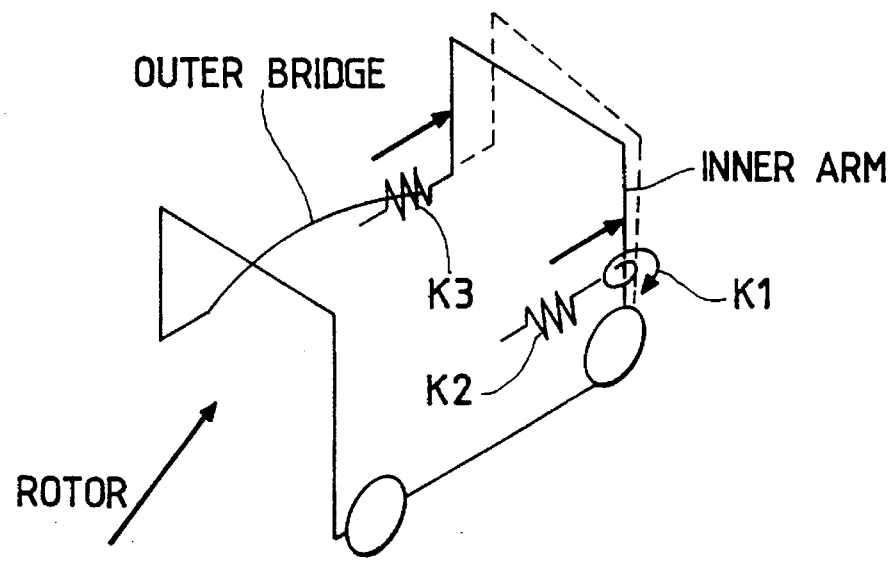
FIG. 23 is a model view of an FEM analysis.

Now, FIG. 23 is a explanatory view of a model employed in an FEM analysis which is used to optimize the shape of a mounting member. In FIG. 23, reference character K1 stands for an elastic modulus relating to the amount of pad vibration caused by the torsion of the inner arm due to the brake torque applied to the outer pad, K2 stands for an elastic modulus related to the amount of pad vibration caused by the bending of the inner arm due to the torque applied to the inner pad, and K3 represents an elastic modulus related to the amount of pad vibration caused by the deformation of the outer bridge. With these elastic moduli K1, K2 and K3 used as variables, the amplitude amounts and amplitude differences on the inner and outer sides of the mounting member were reduced when compared with the amplitude amount and difference that had caused the low frequency brake squeal to occur and were varied to various values, and the relation between the vibration amounts on the inner and outer sides and the easiness of occurrence of the low frequency brake squeal was examined. This examination shows us that the smaller than vibration amounts on the inner and outer sides are, the lower the rate of occurrence of the low frequency brake squeal is, and also that the smaller the difference between the vibration amounts of the inner and outer sides is, the lower the rate of occurrence of the low frequency brake squeal is. In addition, the examination shows that the elastic modulus K1 has a great effect on the vibration amount of the outer side of the mounting member.

Also, the elastic deformation amounts of the respective portions of a conventional mounting member in which the rate of occurrence of the low frequency brake squeal is almost 100% were calculated. As the result of this calculation, it is found that the portions of the outer bridge situated near one outer arm for receiving the brake torque applied to the outer pad are bent and deformed in the rotor radial direction, while the portions thereof situated near the other outer arm are bent and deformed in the rotor axial direction, which promotes an increase in the vibration amount of the outer pad.

As in a mounting member for a disk brake according to the first aspect of the invention, the rotor radial direction portions of one of the two inner arms (11A, 11B, 31A, 31B), namely, one inner arm (11A, 31A) for receiving the brake torque applied to the inner pad when the car is running forwardly, respectively have the second moment of inertia of area I corresponding to the bending moment due to the brake torque applied to the inner pad and increasing toward the mounting portion (11Ab, 31Ab), and also have the polar moment of inertia of area J corresponding to the torsion moment due to the brake torque applied to the outer pad and substantially uniform. Due to this, even if the outer bridge is so formed as to have a similar section shape to the conventional mounting member, the bending rigidity and torsion rigidity of the inner arm are greatly enhanced and the vibration amounts of the inner and outer sides of the present mounting member as well as the difference between them are reduced greatly when compared with the conventional mounting member, thereby being able to reduce the rate of occurrence of the low frequency brake squeal down to approx. 20% and also to reduce the weight increase of the present mounting member down to approx. 1.5 times the weight of the conventional mounting member having the low frequency brake squeal occurrence rate of almost 100%.

In a mounting member for a disk brake according to the first aspect of the invention, J/I=2.0 to 3.5, whereas in the conventional mounting member having the low frequency brake squeal occurrence rate of about 100%, J/I=1.5 to 1.9.

As in a mounting member for a disk brake according to the second aspect of the invention, in a mounting member according to the first aspect of the invention, the torque receiving portion (11Aa, 31Aa) of one inner arm (11A, 31A) is formed in a groove shape into which the substantially rectangular projection provided on the rotor chord direction end face of the back metal plate of the inner pad can be fitted, and the reinforcing rib (11K, 31K) is formed near on the opposite side to the torque receiving portion (11Aa, 31Aa) of the inner arm (11A, 31A) in such a manner that it projects inwardly from the mounting portion (11Aa, 31Aa) of the same inner arm (11A, 31A) to the slightly upper portion of the toque receiving portion (11Aa, 31Aa) and the amount of projection of the portion (11Ka, 31Ka) thereof situated near the torque receiving portion (11Aa, 31Aa) is larger than that of the portion (11Kb, 31Kb) thereof situated near the mounting portion (11Ab, 31Ab). Due to this, the torsion rigidity and bending rigidity of the inner arm can be enhanced effectively and the weight of the present mounting member can be reduced down to 1.25 times the weight of the conventional mounting member having the low frequency brake squeal occurrence rate of almost 100%, while the moldability of the present mounting member is excellent.

Also, as in a mounting member for a disk brake according to the third aspect of the invention, tile section of the outer bridge (21H, 31H) in the rotor radial direction, in the portion (21Ha, 31Ha) thereof situated near one of the two outer arms (21C, 21D, 31C, 31D), namely, one outer arm (21C, 31C) for receiving the brake torque applied to the outer pad when the car is running forwardly, shows a substantially rectangular shape in which the length A thereof in the rotor radial direction is larger than the length B thereof in the rotor axial direction, and, in the portion (21Hb, 31Hb) thereof situated near the other outer arm (21D, 31D), shows a substantially rectangular shape in which the rotor radial direction length thereof is smaller than the above length A and the rotor axial direction length thereof is larger than the above length B, while the rotor radial direction sectional shape of the outer bridge is gradually varied and switched over from one outer arm (21C, 31C) toward the other outer arm (21D, 31D). Due to this, the outer bridge (21H, 31H) is prevented from being bent and deformed when applying the brake, and it can be made as thin as possible, which makes it possible to control an increase in the weight thereof and reduce the vibration amount of the outer side thereof to thereby be able to reduce the occurrence of the low frequency brake squeal. That is, even when J/I=1.5 to 1.9, the rate of occurrence of the low frequency brake squeal can be reduced down to about 30% and the weight of the present mounting member can be controlled down to approx. 1.05 times the weight of the conventional mounting member having the low frequency brake squeal occurrence rate of almost 100%.

Further, as in a mounting member for a disk brake according to the fourth aspect of tile invention, the rotor radial direction portions of one of the two inner arms (31A, 31B), namely, one inner arm (31A) for receiving the brake torque applied to the inner pad when the car is running forwardly respectively have not only the second moment of inertia of area I corresponding to the bending moment due to the brake torque applied to the inner pad and increasing toward the mounting portion (31Ab) but also the polar moment of inertia of area J corresponding to the torsion moment due to the brake torque applied to the outer pad and substantially uniform. Also, the rotor radial direction section of the outer bridge (31H), in the portion (31Ha) thereof situated near one of the two outer arms (31C, 31D), namely, one outer arm (31C) for receiving the brake torque applied to the outer pad when the car is running forwardly, shows a substantially rectangular shape in which the rotor radial direction length thereof A is larger than the rotor axial direction length thereof B, and, in the portion (31Hb) thereof situated near the other outer arm (31D), shows a substantially rectangular shape in which the rotor radial direction length thereof is smaller than the above length A and the rotor axial direction length thereof is larger than the above length B, while the rotor radial direction sectional shape of the outer bridge is gradually varied and switched over from one outer arm (31C) toward the other outer arm (31D). This structure can reduce the lower frequency brake squeal occurrence rate down to about 5% and also can control the weight of the present mounting member down to approx. 1.3 times the weight of the conventional mounting member having the low frequency brake squeal occurrence rate of almost 100%.

Figure 24:
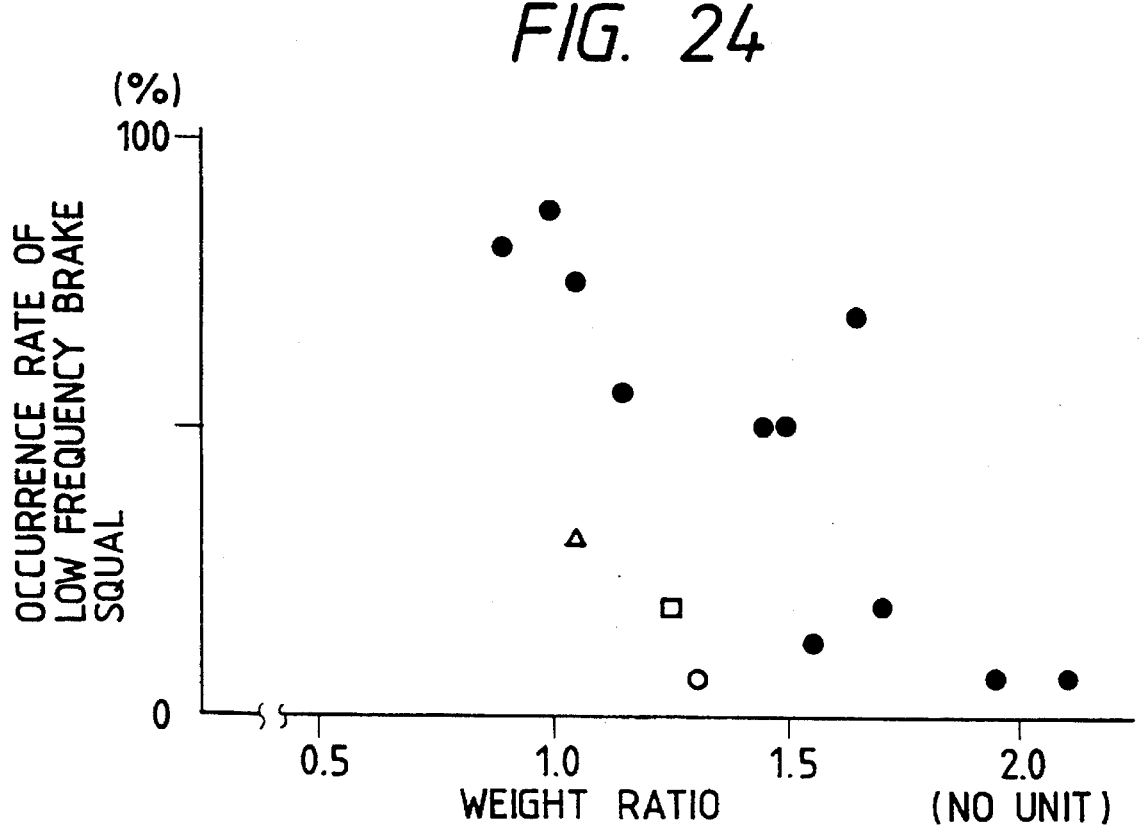
FIG. 24 is a graphical representation of a relationship between a mounting member for a disk brake and the occurrence rate of the low frequency brake squeal.
Figure 25:
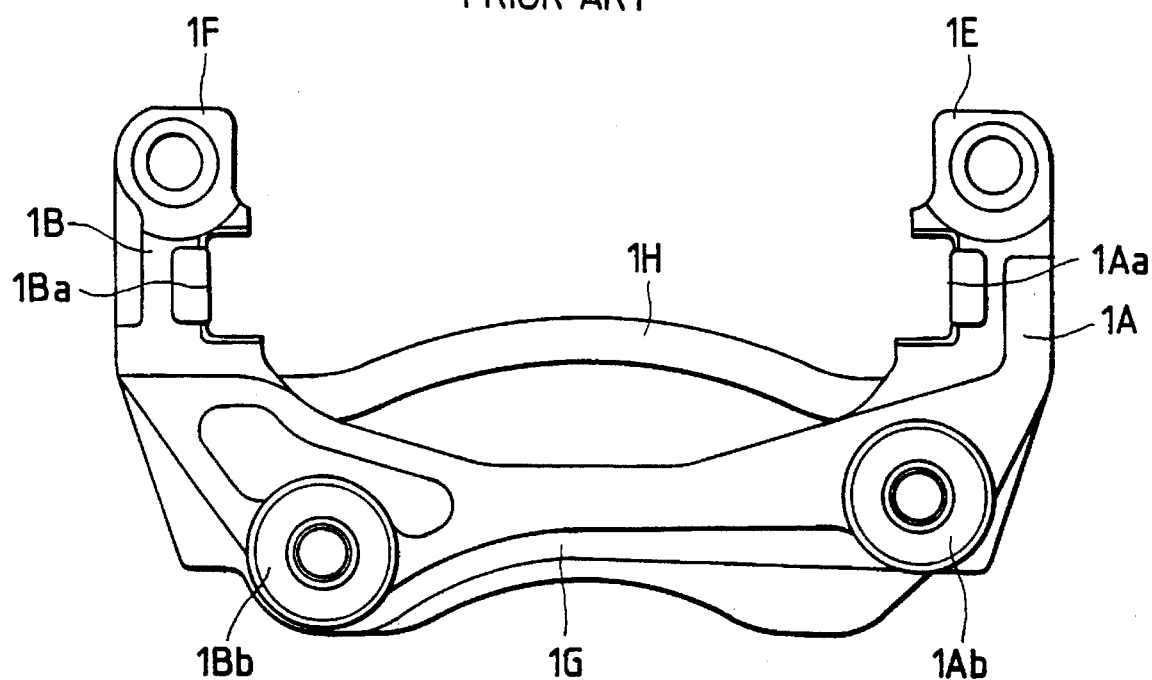
FIG. 25 is a front view (when viewed from the inner side) of a conventional mounting member for a disk brake.
Figure 26:
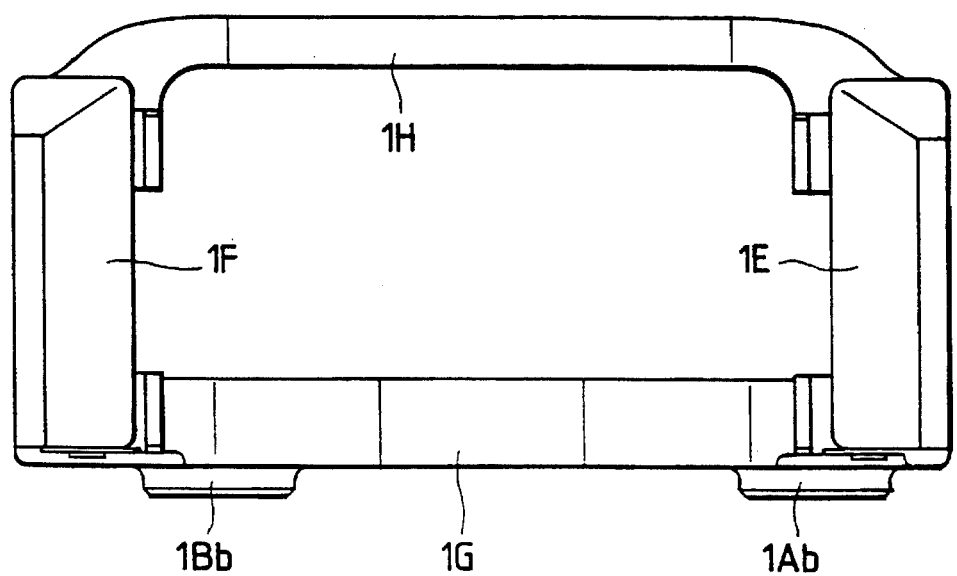
FIG. 26 is a plan view of the conventional mounting member for a disk brake.
Figure 27:
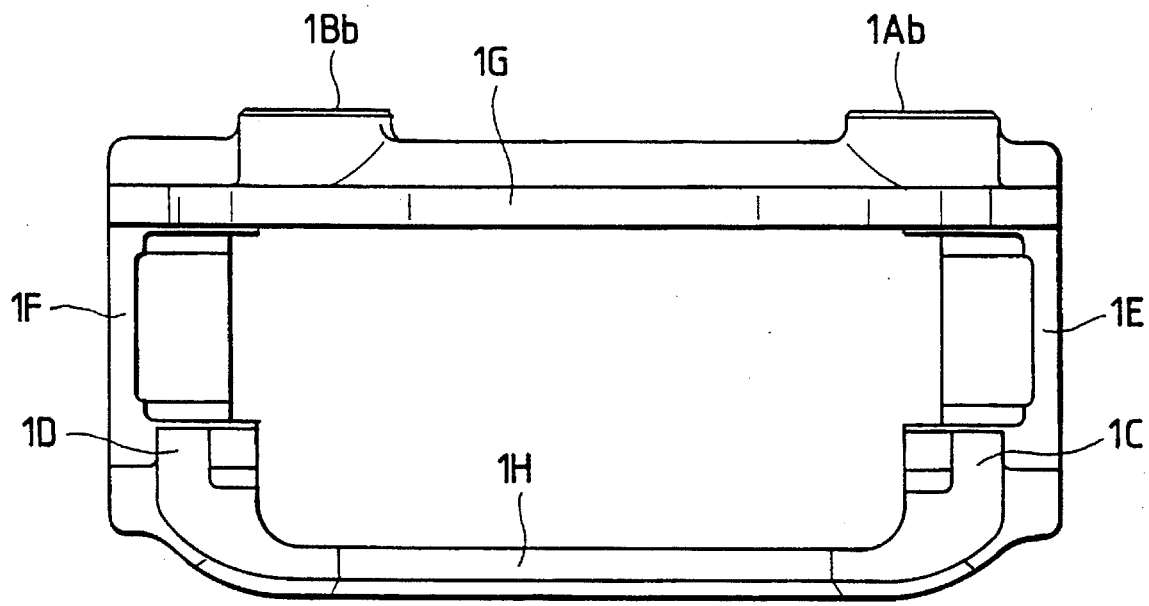
FIG. 27 is a bottom view of the conventional mounting member for a disk brake.
Figure 28:
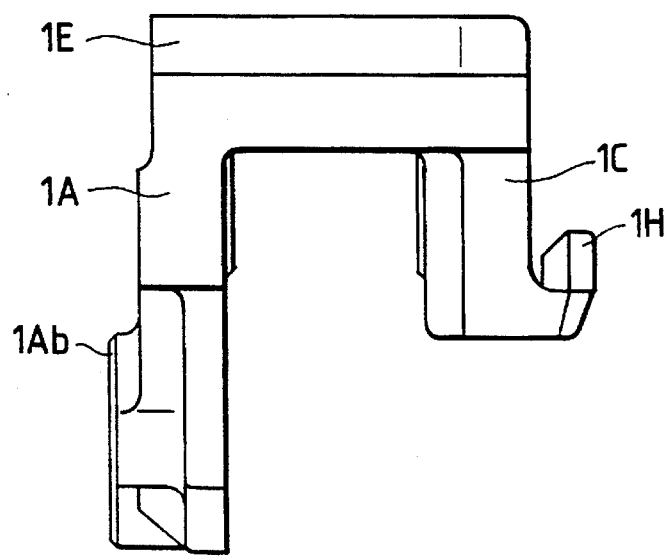
FIG. 28 is a right side view of the conventional mounting member for a disk brake; and, FIG. 29 is a back view of the conventional mounting member for a disk brake.
Figure 29:
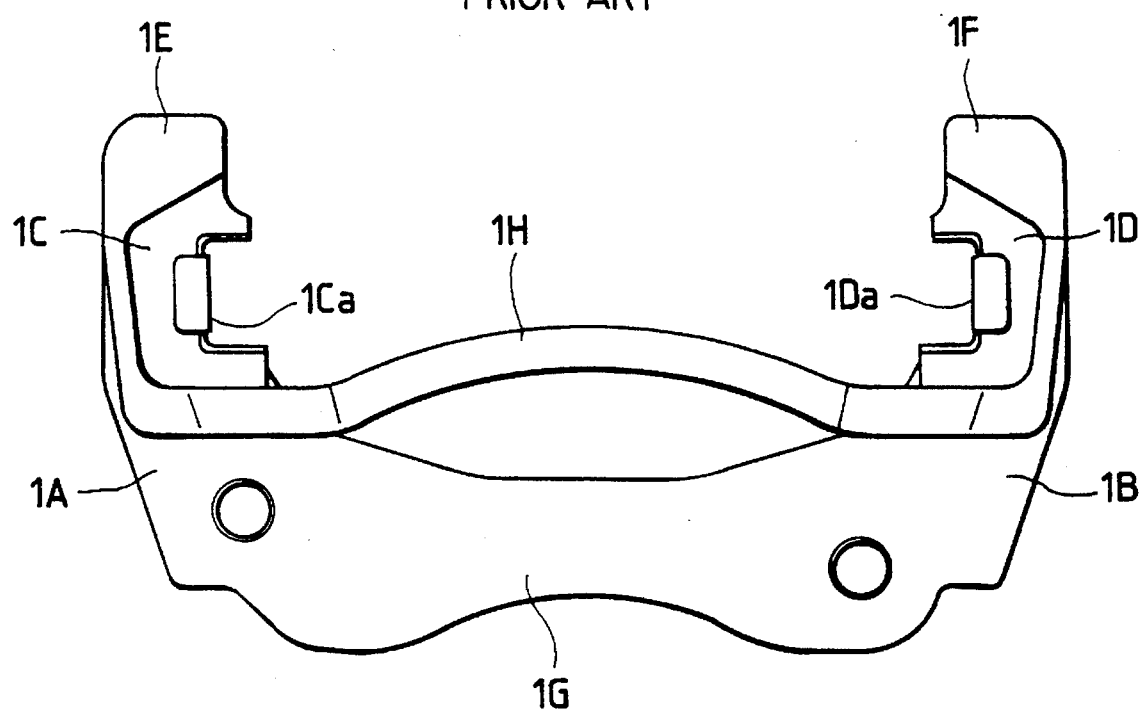

Now, FIG. 24 is a graphical representation which shows a relationship between the weight of the mounting member for a disk brake and the occurrence rate of the low frequency brake squeal. In this figure, black solid marks respectively designate the mounting members for a disk brake respectively shown in FIGS. 24 to 28, a white square make stands for the first embodiment of the invention shown in FIGS. 1 to 6, a white triangular mark points out the second embodiment shown in FIGS. 7 to 13, and a white circular mark represents the third embodiment shown in FIGS. 14 to 22.

As shown in FIGS. 1 to 6, a mounting member 11 for a disk brake according to a first embodiment of the invention comprises: a pair of inner arms 11A and 11B respectively including groove shaped torque receiving portions 11Aa, 11Ba for receiving a brake torque applied to an inner pad (not shown) to be pressed against the inside surface of a rotor (not shown) rotatable integrally with a wheel (not shown), and also including in the rotor radial direction inner end portions thereof mounting portions 11Ab, 11Bb for fastening and fixing the inner arms 11A and 11B to the non-rotary parts of a car such as a knuckle and the like by use of bolts (not shown); a pair of outer arms 11C and 11D respectively including groove shaped torque receiving portions 11Ca and 11Da for receiving a brake torque applied to an outer pad (not shown) to be pressed against the outside surface of the rotor; a pair of connecting portions 11E and 11F extending in the rotor axial direction in the outer peripheral space of the rotor for connecting the rotor radial direction outer ends of the two inner arms 11A and 11B integrally with the rotor radial direction outer ends of the two outer arms 11C and 11D; an inner bridge 11G extending in the rotor chord direction for connecting the rotor radial direction inner ends of the two inner arms 11A and 11B integrally with each other; and, an outer bridge 11H extending in the rotor chord direction for connecting the rotor radial direction inner ends of the two outer arms 11C and 11D integrally with each other.

The brake torques (shown by arrows) applied to the inner and outer pads when the car is running forwardly are received by the inner arm 11A and outer arm 11C. The inner arm 11A includes, in the portion thereof near the opposite side to the side where the torque receiving portion 11Aa of the inner arm 11A is provided, a reinforcing rib 11K which projects inwardly from the mounting portion 11Aa of the inner arm 11A to the slightly upper portion of the torque receiving portion 11Aa of the inner arm 11A in such a manner that the amount of projection of the portion 11Ka thereof situated near the torque receiving portion 11Aa is greater than that of the portion 11Kb thereof situated near the mounting portion 11Ab. The respective portions of the inner arm 11A in the rotor radial direction have not only the second moment of inertia of area I (see FIG. 6(a)) corresponding to the bending moment caused by the brake torque applied to the inner pad and increasing toward the mounting portion 11Ab but also the polar moment of inertia of area J (see FIG. 6(b)) which corresponds to the torsion moment caused by the brake torque applied to the outer pad and is substantially uniform.

Here, FIG. 6(a) shows the bending moment of the inner arm 11A caused by the brake torque applied to the inner pad, while FIG. 6(b) shows the torsion moment of the inner arm 11A caused by the brake torque applied to the outer pad.

The outer bridge 11H, basically, has a section which is uniformly rectangular. However, the section of the outer bridge 11H is set such that, in the portions thereof respectively situated near the outer arms 11C and 11D, it has such a degree of rigidity as can prevent generation of the elastic deformation found in the conventional mounting member in which the low frequency brake squeal occurs at a rate of almost 100%.

When compared with the conventional mounting member having the low frequency brake squeal occurrence rate of almost 100%, the weight of the mounting member 1 having the above structure is approx. 1.25 times and the rate of occurrence of the low frequency brake squeal thereof is about 20%.

Now, a mounting member 21 for a disk brake according to a second embodiment of the invention shown in FIGS. 7 to 13 is a single member which comprises: a pair of inner arms 21A and 21B which respectively include groove shaped torque receiving portions 21Aa, 21Ba for receiving the brake torque applied to an inner pad (not shown) to be pressed against the inside surface of a rotor (not shown) rotatable integrally with a wheel (not shown), and also include, in the rotor radial direction inner end portions thereof, mounting portions 21Ab, 21Bb for fastening and fixing the inner arms 21A and 21B to the non-rotary parts (not shown) of a car such as a knuckle and the like by use of bolts (not shown); a pair of outer arms 21C and 21D which respectively include groove shaped torque receiving portions 21Ca and 21Da for receiving a brake torque applied to an outer pad (not shown) to be pressed against the outside surface of the rotor; a pair of connecting portions 21E and 21F which respectively extend in the rotor axial direction in the outer peripheral space of the rotor and connect the rotor radial direction outer ends of the two inner arms 21A and 21B integrally with the rotor radial direction outer ends of the two outer arms 21C and 21D; an inner bridge 21G which extends in the rotor chord direction and connects the rotor radial direction inner ends of the two inner arms 21A and 21B integrally with each other; and, an outer bridge which extends in the rotor chord direction and connects the rotor radial direction inner ends of the two outer arms 21C and 21D integrally with each other.

The brake torques applied to the inner and outer pads when the car is running forwardly are received by the inner arm 21A and outer arm 21C. And, a ratio of the polar moment of inertia of area J in connection with the torsion rigidity of the inner arm 21A to the second moment of inertia of area I in connection with the bending rigidity of the inner arm 21A (J/I) is approx. 1.9.

The outer bridge 21H, in the portion 21Ha thereof situated near the outer arm 21C for receiving the brake torque applied to the outer pad when the car is running forwardly, is formed in a substantially rectangular shape in which the length thereof in the rotor radial direction (which is referred to as the length A) is greater than the length thereof in the brake disk axial direction (which is referred to as the length B). Also, the outer bridge 21H, in the portion 21Hb thereof situated near the other outer arm 21D, is formed in a substantially rectangular shape in which the rotor radial direction length is smaller than the length A and the rotor axial direction length is greater than the length B. And, the shape of the outer bridge 21H is gradually varied and switched over from one outer arm 21C toward the other outer arm 21D. The sections of the respective portions of the outer bridge 21H, in the portions thereof situated near the outer arms 21C and 21D, are so formed as to have a degree of rigidity which can prevent elastic deformation found in the conventional mounting member having the low frequency brake squeal occurrence rate of almost 100%.

When compared with the conventional mounting member having the low frequency brake squeal occurrence rate of almost 100%, the weight of the mounting member 21 having the above structure is approx. 1.05 times and the rate of occurrence of the low frequency brake squeal thereof is about 30%.

Now, a mounting member 31 for a disk brake according to a third embodiment of the invention shown in FIGS. 14 to 22 is a single member which comprises: a pair of inner arms 31A and 31B which respectively include groove shaped torque receiving portions 31Aa, 31Ba for receiving the brake torque applied to an inner pad (not shown) to be pressed against the inside surface of a rotor (not shown) rotatable integrally with a wheel (not shown), and also include, in the rotor radial direction inner end portions thereof, mounting portions 31Ab, 31Bb for fastening and fixing the inner arms 31A and 31B to the non-rotary parts (not shown) of a car such as a knuckle and the like by use of bolts (not shown); a pair of outer arms 31C and 31D which respectively include groove shaped torque receiving portions 31Ca and 31Da for receiving the brake torque applied to an outer pad (not shown) to be pressed against the outside surface of the rotor; a pair of connecting portions 31E and 31F which respectively extend in the rotor axial direction in the outer peripheral space of the rotor and connect the rotor radial direction outer ends of the two inner arms 31A and 31B integrally with the rotor radial direction outer ends of the two outer arms 31C and 31D; an inner bridge 31G which extends in the rotor chord direction and connects the rotor radial direction inner ends of the two inner arms 31A and 31B integrally with each other; and, an outer bridge which extends in the rotor chord direction and connects the rotor radial direction inner ends of the two outer arms 31C and 31D integrally with each other.

The brake torques (shown by arrows) applied to the inner and outer pads when the car is running forwardly are respectively received by the inner arm 31A and outer arm 31C. The inner arm 31A includes, in the portion thereof situated near the opposite side to the side where the torque receiving portion 31Aa of the inner arm 31A is provided, a reinforcing rib 31K which projects inwardly from the mounting portion 31Aa of the inner arm 31A to the slightly upper portion of the torque receiving portion 31Aa of the inner arm 31A in such a manner that the amount of projection of the portion 31Ka thereof situated near the torque receiving portion 31Aa is greater than that of the portion 31Kb thereof situated near the mounting portion 31Ab. The respective portions of the inner arm 31A in the rotor radial direction have not only the second moment of inertia of area I (see FIG. 22(a)) corresponding to the bending moment caused by the brake torque applied to the inner pad and increasing toward the mounting portion 31Ab but also the polar moment of inertia of area J (see FIG. 22(b)) which corresponds to the torsion moment caused by the brake torque applied to the outer pad and is substantially uniform.

Here, FIG. 22(a) shows the bending moment of the inner arm 31A caused by the brake torque applied to the inner pad, while FIG. 22(b) shows the torsion moment of the inner arm 31A caused by the brake torque applied to the outer pad.

The outer bridge 31H, in the portion 31Ha thereof situated near the outer arm 31C for receiving the brake torque applied to the outer pad when the car is running forwardly, is formed in a substantially rectangular shape in which the length thereof in the rotor radial direction (which is referred to as the length A) is greater than the length thereof in the brake disk axial direction (which is referred to as the length B). Also, the outer bridge 31H, in the portion 31Hb thereof situated near the other outer arm 31D, is formed in a substantially rectangular shape in which the rotor radial direction length is smaller than the length A and the rotor axial direction length is greater than the length B. And, the shape of the outer bridge 31H is gradually varied and switched over from the outer arm 31C toward the other outer arm 31D. The sections of the respective portions of the outer bridge 31H, in the portions thereof situated near the outer arms 31C and 31D, are so formed as to have a degree of rigidity which can prevent elastic deformation found in the conventional mounting member having the low frequency brake squeal occurrence rate of almost 100%.

When compared with the conventional mounting member having the low frequency brake squeal occurrence rate of almost 100%, the weight of the mounting member 31 having the above structure is approx. 1.3 times and the rate of occurrence of the low frequency brake squeal thereof is about 5%.

Here, when the same reduction of the low frequency brake squeal is required in both of the forward and backward runnings of the car, the above-mentioned J and I are to be set for each of the two inner arms.

As has been described heretofore, a mounting member for a disk brake according to the invention can minimize the occurrence of the low frequency brake squeal and is relatively light in weight, and can reduce greatly the noise or the low frequency brake squeal without impairing the fuel efficiency and power performance of the car so much.

What is claimed is:

1. A mounting member for a disk brake formed as a single member, comprising:

a pair of inner arms respectively including torque receiving portions for receiving a brake torque applied to an inner pad to be pressed against an inside surface of a rotor rotatable integrally with a wheel, and, in rotor radial direction inner ends thereof, mounting portions for fastening and fixing said inner arms to non-rotary parts of a vehicle by use of bolts;

a pair of outer arms respectively including torque receiving portions for receiving a brake torque applied to an outer pad to be pressed against an outside surface of said rotor;

a pair of connecting portions respectively extending in a rotor axial direction in an outer peripheral space of said rotor and connecting the rotor radial direction outer ends of said two inner arms integrally with rotor radial direction outer ends of said outer arms;

an inner bridge extending in a rotor chord direction and connecting the rotor radial direction inner ends of said two inner arms integrally with each other;

an outer bridge extending in the rotor chord direction and connecting the rotor radial direction inner ends of said two outer arms integrally with each other; and a reinforcing rib which projects inwardly at an inner side of the inner arm near the torque receiving portion of the inner arms, said reinforcing rib being provided on one of said inner arms for enhancing a twist rigidity of said inner arm.

2. A mounting member for a disk brake as set forth in claim 1, wherein said torque receiving portion of said inner arm is formed in a groove into which a substantially rectangular projection provided on a rotor chord direction end face of a back metal plate of said inner pad is fitted, and also includes, in a portion thereof situated near an opposite side to a side where said torque receiving portion of said inner arm is formed, said reinforcing rib projects inwardly from said mounting portion of said inner arm to a slightly upper portion of said torque receiving portion of said inner arm in such a manner that an amount of projection in a portion thereof situated near said torque receiving portion of said inner arm is greater than an amount of projection in a portion thereof situated near said mounting portion.

3. A mounting member for a disk brake as set forth in claim 1, wherein said reinforcing rib projects inwardly from said mounting portion of said inner arm to a slightly upper portion of said torque receiving portion of said inner arm in such a manner that an amount of projection in a portion thereof situated near said torque receiving portion of said inner arm is greater than an amount of projection in a portion thereof situated near said mounting portion.

4. A mounting member for a disk brake as set forth in claim 1, wherein said torque receiving portion of said inner arm is formed in a groove into which a substantially rectangular projection provided on a rotor chord direction end face of a back metal plate of said inner pad,is fitted.

5. A mounting member for a disk brake as set forth in claim 1, wherein said one of said inner arms receives a brake torque which is applied to the inner pad when the vehicle is moving forward.

6. A mounting member for a disk brake as set forth in claim 1, wherein said outer bridge extends in the rotor chord direction and connects rotor radial direction inner ends of said two outer arms integrally with each other, wherein a section of said outer bridge in the rotor radial direction, in a portion thereof situated near one of said two outer arms, which is, one outer arm of said two outer arms for receiving said brake torque applied to said outer pad when the vehicle is running forwardly, has a substantially rectangular shape in which a rotor radial direction length A thereof is greater than a rotor axial direction length B thereof, and, in a portion thereof situated near said other outer arm, has a substantially rectangular shape in which a rotor radial direction length thereof is smaller than said length A and a rotor axial direction length thereof is greater than said length B, while said rotor radial direction section of said outer bridge is gradually varied and switched over from said one outer arm toward said other outer arm, such that a deformation of the outer bridge is restrained by the rectangular shape of the outer bridge.

7. A mounting member for a disk brake formed as a single member, comprising:

a pair of inner arms respectively including torque receiving portions for receiving a brake torque applied to an inner pad to be pressed against an inside surface of a rotor rotatable integrally with a wheel, and, in rotor radial direction inner ends thereof, mounting portions for fastening and fixing said inner arms to non-rotary parts of a vehicle by use of bolts;

a pair of outer arms respectively including torque receiving portions for receiving a brake torque applied to an outer pad to be pressed against an outside surface of said rotor;

a pair of connecting portions respectively extending in a rotor axial direction in an outer peripheral space of said rotor and connecting rotor radial direction outer ends of said two inner arms integrally with rotor radial direction outer ends of said outer arms;

an inner bridge extending in a rotor chord direction and connecting the rotor radial direction inner ends of said two inner arms integrally with each other; and, an outer bridge extending in the rotor chord direction and connecting rotor radial direction inner ends of said two outer arms integrally with each other, wherein a section of said outer bridge in the rotor radial direction, in a portion thereof situated near one of said two outer arms, which is, one outer arm of said two outer arms for receiving said brake torque applied to said outer pad when the car is running forwardly, has a substantially rectangular shape in which a rotor radial direction length A thereof is greater than a rotor axial direction length B thereof, and, in a portion thereof situated near said other outer arm, has a substantially rectangular shape in which a rotor radial direction length thereof is smaller than said length A and a rotor axial direction length thereof is greater than said length B, while said rotor radial direction section of said outer bridge is gradually varied and switched over, from said one outer arm toward said other outer arm, such that a deformation of the outer bridge is restrained by the rectangular shape of the outer bridge.

* * * * *